United States Patent
Folsom et al.

[11] Patent Number: 5,899,485
[45] Date of Patent: May 4, 1999

[54] AIR BAG MODULE WITH SIMPLIFIED MANIFOLD

[75] Inventors: Bruce Allen Folsom, Northville; Mohamed Boumarafi, Rochester Hills, both of Mich.

[73] Assignee: Takata, Inc., Auburn Hills, Mich.

[21] Appl. No.: 08/763,309

[22] Filed: Dec. 10, 1996

[51] Int. Cl.$^6$ .................................................. B60R 21/16
[52] U.S. Cl. ...................... 280/728.2; 280/736; 280/740; 280/742
[58] Field of Search ............................ 280/728.2, 730.2, 280/732, 740, 736, 742

[56] References Cited

U.S. PATENT DOCUMENTS

| | | | |
|---|---|---|---|
| 4,915,410 | 4/1990 | Bachelder | 280/732 |
| 5,186,492 | 2/1993 | Wright et al. | 280/743 |
| 5,308,108 | 5/1994 | Rion | 280/728 A |
| 5,533,750 | 7/1996 | Karlow et al. | 280/730.2 |
| 5,553,887 | 9/1996 | Karlow et al. | 280/730.2 |
| 5,564,732 | 10/1996 | Bauer et al. | 280/732 |
| 5,605,347 | 2/1997 | Karlow et al. | 280/728.2 |
| 5,613,704 | 3/1997 | White, Jr. et al. | 280/732 |
| 5,630,610 | 5/1997 | Murakami | 280/728.2 |

FOREIGN PATENT DOCUMENTS

WO9013457  11/1990  WIPO ................................ 280/728 A

*Primary Examiner*—Harold J. Tudor
*Attorney, Agent, or Firm*—Harness, Dickey & Pierce, P.L.C.

[57] ABSTRACT

An improved air bag module having a manifold designed with integral keys configured to lock the manifold, retainer, air bag and soft cover to the housing. The manifold is elastically deformable and the keys are configured to be inserted into slots in the retainer and housing while the manifold is elastically compressed. Upon releasing the compression force the manifold expands and the keys are locked into the retainer and housing slots locking the individual sub-module pieces together. The air bag and soft cover are trapped between the manifold and the retainer during assembly. The soft cover and module housing are configured to open upon air bag deployment, allowing the air bag to inflate outside of the air bag module.

13 Claims, 8 Drawing Sheets

AIR BAG MODULE WITH SIMPLIFIED MANIFOLD

BACKGROUND OF THE INVENTION

1. Field of the Invention

This invention relates generally to supplemental motor vehicle occupant restraint systems, and more particularly, to an air bag module design having an improved manifold design for ease of assembly of the module and for protection of the air bag.

2. Background Information

A significant number of people are injured every year by automobile collisions. In order to enhance protection of the automobile occupants, automakers have used air bags as supplemental restraints for use in conjunction with belt restraint systems. Currently, air bags can be found protecting the driver and front seat passenger in frontal impacts. Furthermore, air bags have been designed to protect occupants in side impact collisions as well.

A typical air bag module consists of the following components: a housing structure, an air bag, an inflator, a manifold, a retainer, a triggering mechanism and fasteners. The housing provides a structure for mounting the components and attaching the module to the vehicle. The inflator is usually either a stored gas or solid propellant type which provides the fluid for the rapid filling of the air bag. Hybrid inflators have also been developed and are currently in use. Because the gas is rapidly exiting the inflator, it must be controlled and directed into the air bag. Generally, the manifold does this job. Finally, in order to ensure that the air bag is deployed at the appropriate time, a sensing mechanism is needed to trigger the inflation of the air bag.

One concern of the air bag module manufacturer is the manufacturability of the product and its cost. As millions of air bag modules are placed into automobiles every year, the significance of a few grams savings in weight or a few less parts can have a significant cost impact.

SUMMARY OF THE INVENTION

The present invention provides an improved side impact air bag module having a manifold designed with integral keys configured to lock the manifold, air bag and soft cover to the retainer and module housing. During assembly the manifold keys are inserted into slots in the retainer, air bag, soft cover and housing. The manifold is elastically compressed when the keys are inserted and expands, locking the pieces in place, once the compressing force is released.

A principal object of the present invention is to substantially reduce the need for separate mechanical fasteners needed in traditional air bag modules to fasten the sub-module pieces together. Another object of the present invention is to provide a manifold design which also acts as a heat shield to protect the air bag from hot gases emitted by the inflator. A further object of the present invention is to provide a module having an integral means for fastening the module to the vehicle structure.

The above-mentioned objects are accomplished by providing the improved air bag module design of the present invention. The interlocking slot/manifold key design eliminates the need for separate fasteners configured to fasten the sub-module pieces together. The manifold is also configured for protecting the air bag from hot gases emitted from the inflator. The manifold includes flaps located adjacent to the nozzle portion of the inflator when the inflator is assembled into the retainer. Furthermore, the retainer is configured with fastening flanges which are inserted through aperture in the module housing and are used for securing the assembled air bag module to the vehicle structure.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
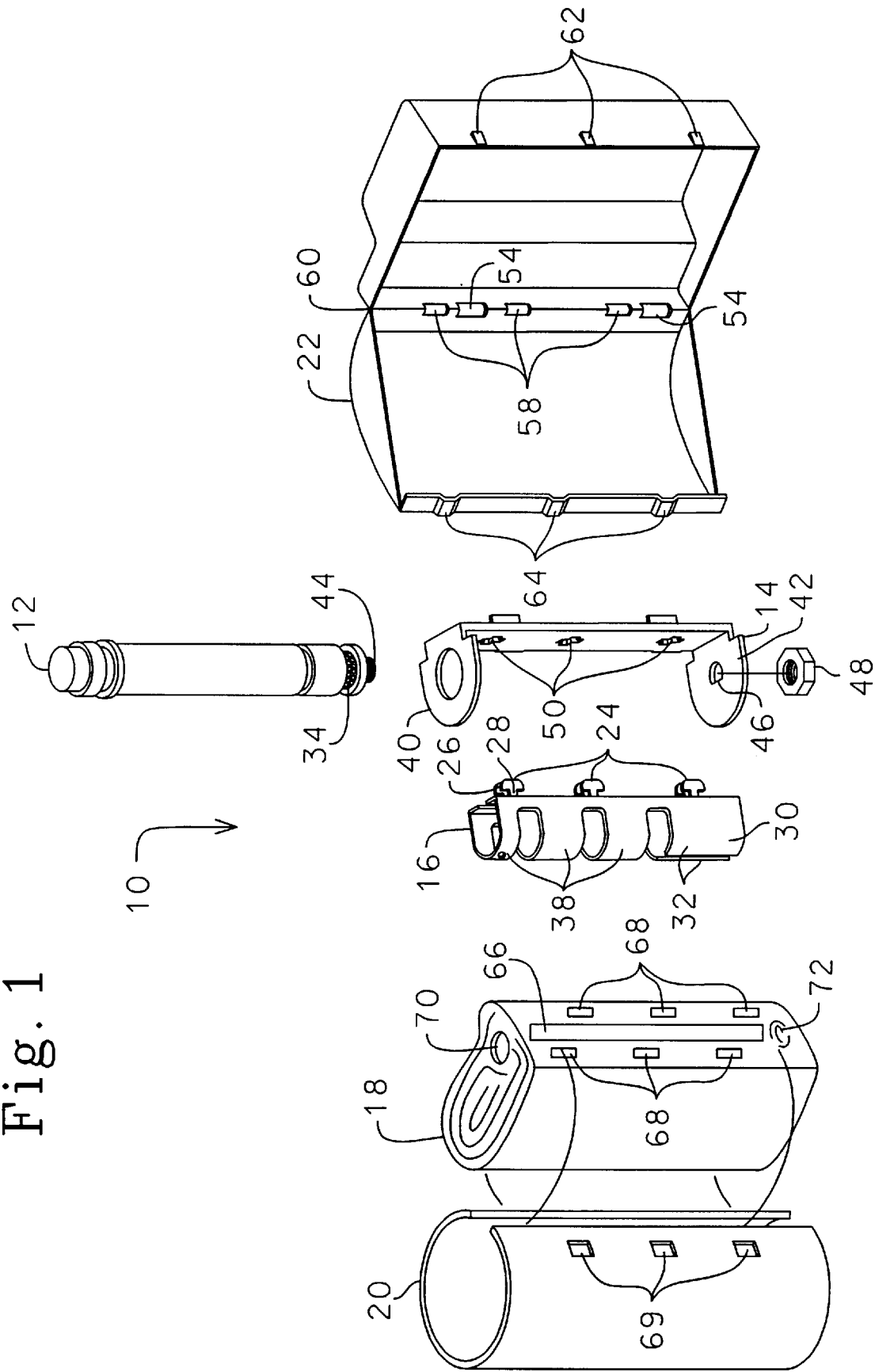
FIG. 1 is an exploded view of a first embodiment of the air bag module of the present invention shown in unassembled form.
Figure 2:
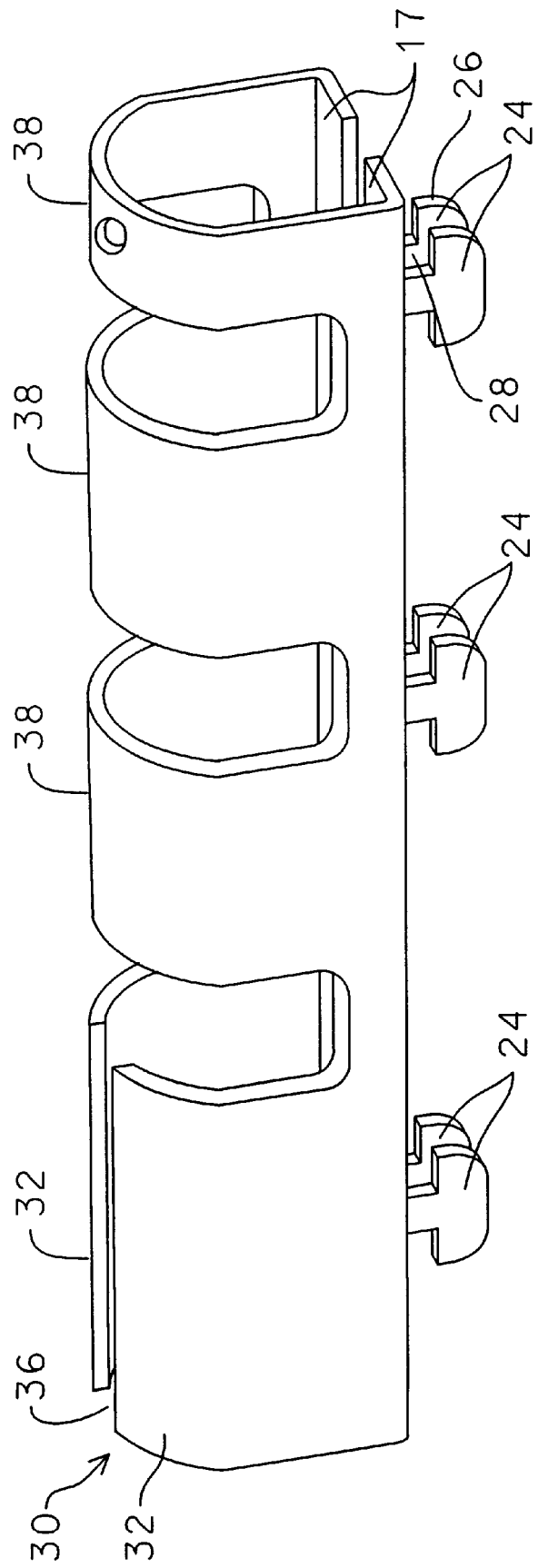
FIG. 2 is a pictorial view of the manifold of FIG. 1 according to the present invention.

Preferred embodiments of the improved air bag module with simplified manifold design will be described herebelow with reference to the drawings.

Referring to FIGS. 1–4, the module assembly, indicated generally at 10, comprises an inflator 12, a retainer 14, a manifold 16, an air bag 18, a soft cover 20, and a module housing 22. The manifold 16, shown in FIG. 2, has a generally U-shaped cross section which is designed to encircle the inflator 12 when the module is assembled. Two rows of keys 24 are integrally formed with the manifold 16 on side extensions 17. The side extensions 17 are configured to extend toward each other into the opening in the U-shaped cross section, placing the rows of keys 24 in close proximity to each other. The keys 24 can be inserted into slots in the housing 22, retainer 14, air bag 18, and soft cover 20 during assembly to hold the individual module pieces together. In the preferred embodiment, the keys 24 are T-shaped and include a pair of tabbed sections 26 connected to the manifold 16 by a stem section 28.

The manifold 16 is also configured as a heat shield to protect the air bag 18 from gases emitted from the inflator 12 during deployment. The manifold 16 includes a gas director 30 which comprises two flaps 32 integrally formed with the manifold 16 and located adjacent to the nozzle portion 34 of the inflator 12 when the module 10 is assembled. The flaps 32 extend around the U-shaped cross-section of the manifold 18 and form a direction opening 36 which is used to control and direct the gases emitted from the inflator 12 into the air bag 18. The manifold 16 also includes several holding straps 38 which help hold toe inflator 12 in place when the module 10 is assembled.

Figure 3:
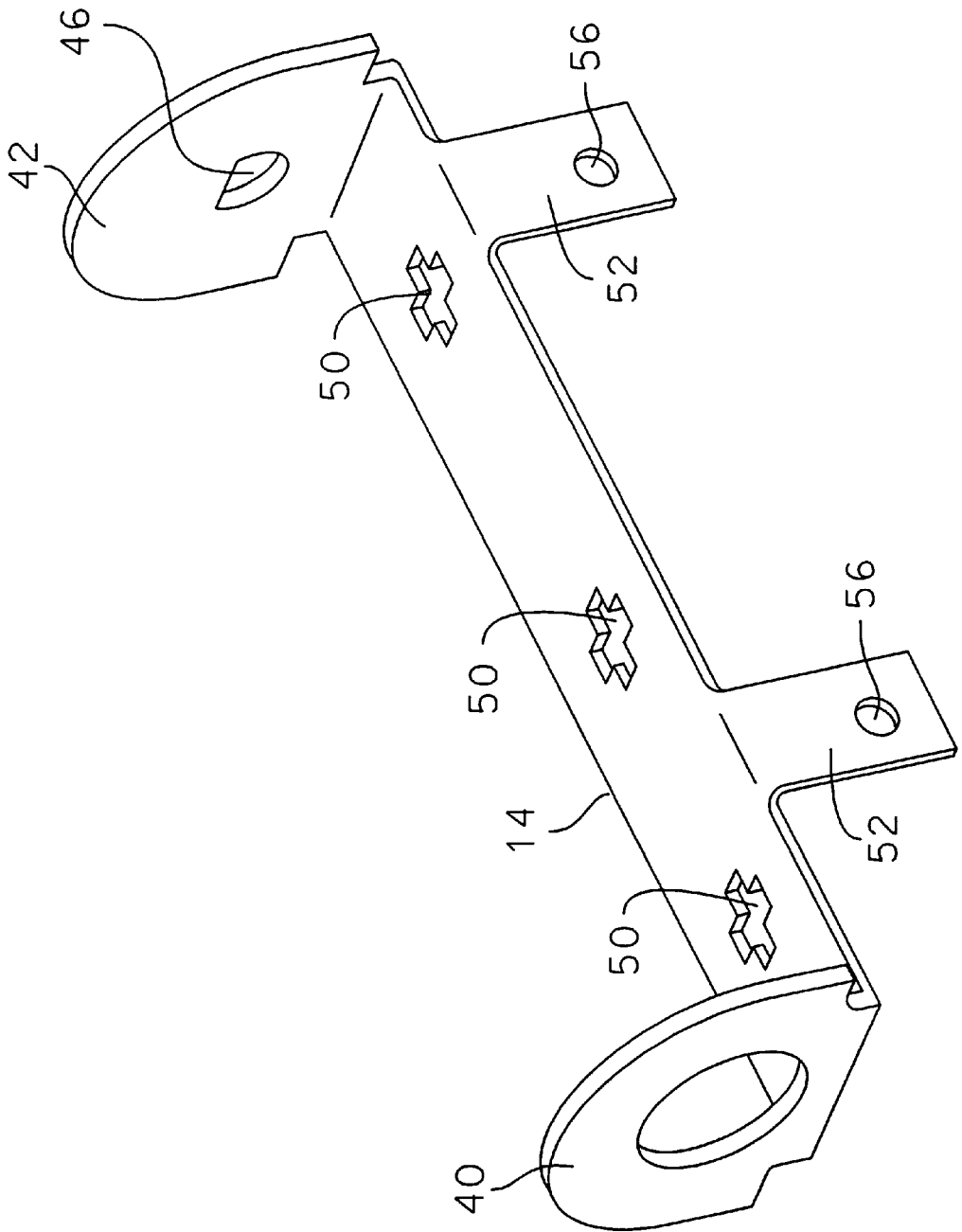
FIG. 3 is a pictorial view of the retainer of FIG. 1 according to the present invention.

The retainer 14, shown in FIG. 3, is configured for securing the inflator 12 to the module housing 22 and for providing a reaction surface during deployment. The retainer 14 comprises a holding ring 40 and a holding flange 42. During assembly, the inflator 12 is inserted through holding ring 40 and a threaded screw end 44 of the inflator 12 is inserted through a hole 46 in the holding flange 42. A threaded nut 48 can be screwed onto the threaded screw end 44 of the inflator 1 2, securing the inflator 12 to the retainer 14. As mentioned above, the retainer 14, includes a row of slots 50 which are cross-shaped and configured for receiving the manifold keys 24.

Assembly is accomplished by elastically compressing the manifold 16 so that the two rows of keys 24 are together. While the manifold 16 is compressed, the keys 24 are inserted in the slots in the retainer 14 with adjacent pairs of keys being inserted into a single slot 50. The keys can also be inserted through the air bag 18, soft cover 20 and housing 22. When the compression force is released from the manifold 16, the manifold 16 expands to lock the two rows of keys 24 in the slots 50. The stems 28 of the keys 24 are trapped in the retainer slots 50 with the tabbed sections 26 of the keys 24 abutting the side of the retainer 14 opposite the manifold 16. The air bag 18 and soft cover 20 are trapped between the manifold 16 and retainer 14. This configuration locks the retainer 14, manifold 16, air bag 18, and soft cover 20 together to form the sub-module. The sub-module can be disassembled by again compressing the manifold 16 and removing the keys 24 from the retainer slots 50.

Figure 4:
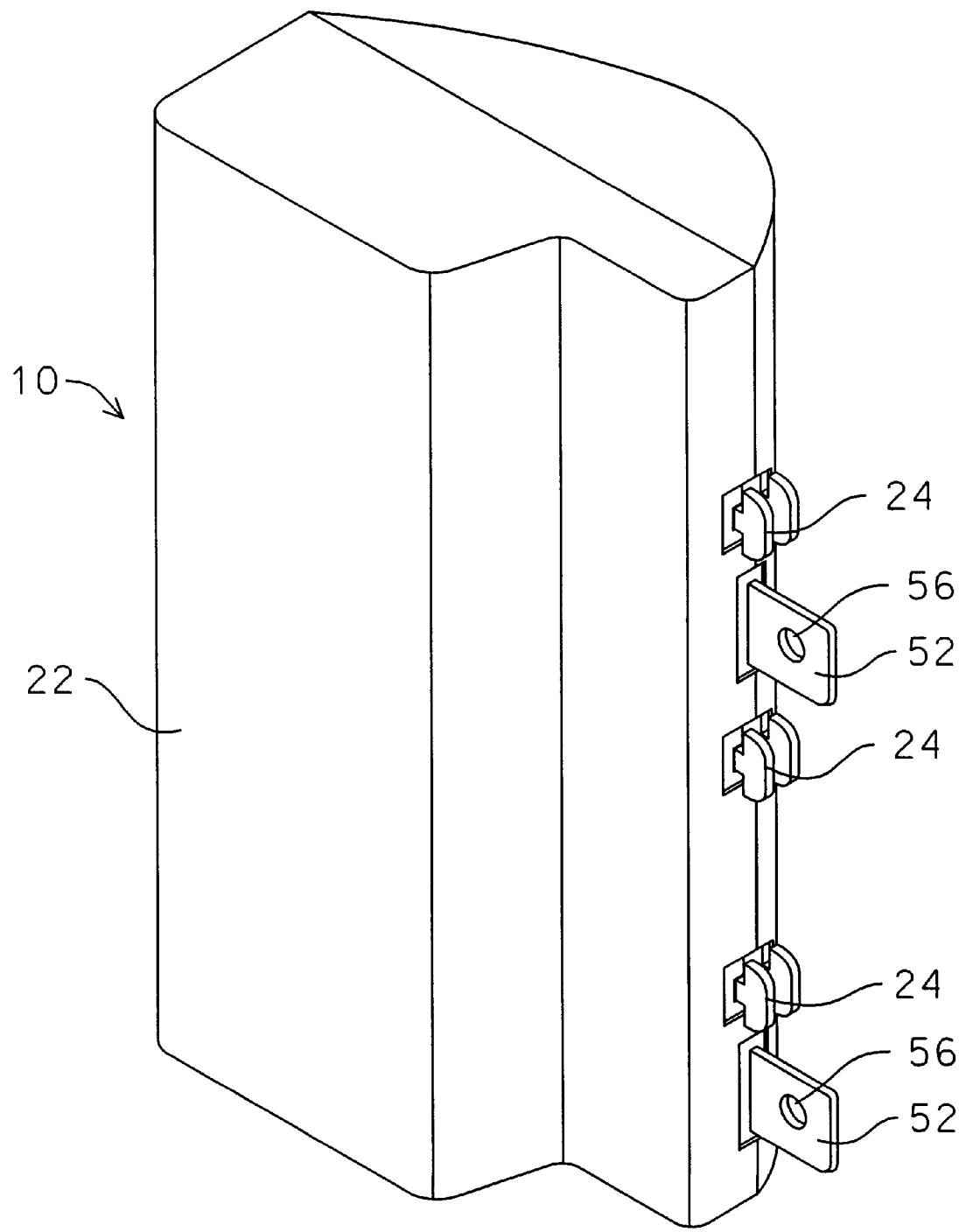
FIG. 4 is a pictorial view of the air bag module of FIG. 1 shown in an assembled form
Figure 5:
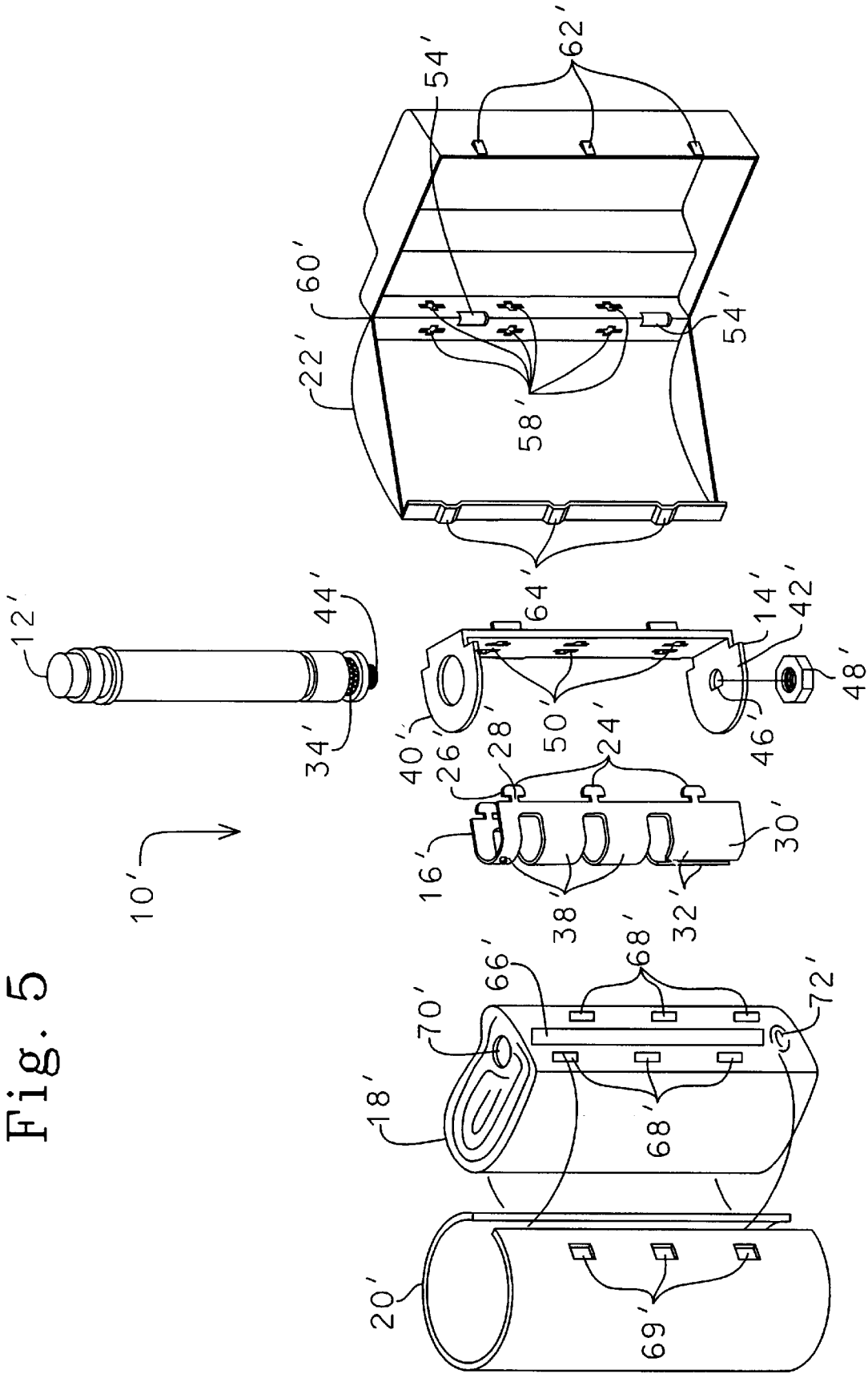
FIG. 5 is an exploded view of a second embodiment of the air bag module of the present invention shown in an unassembled form.
Figure 6:
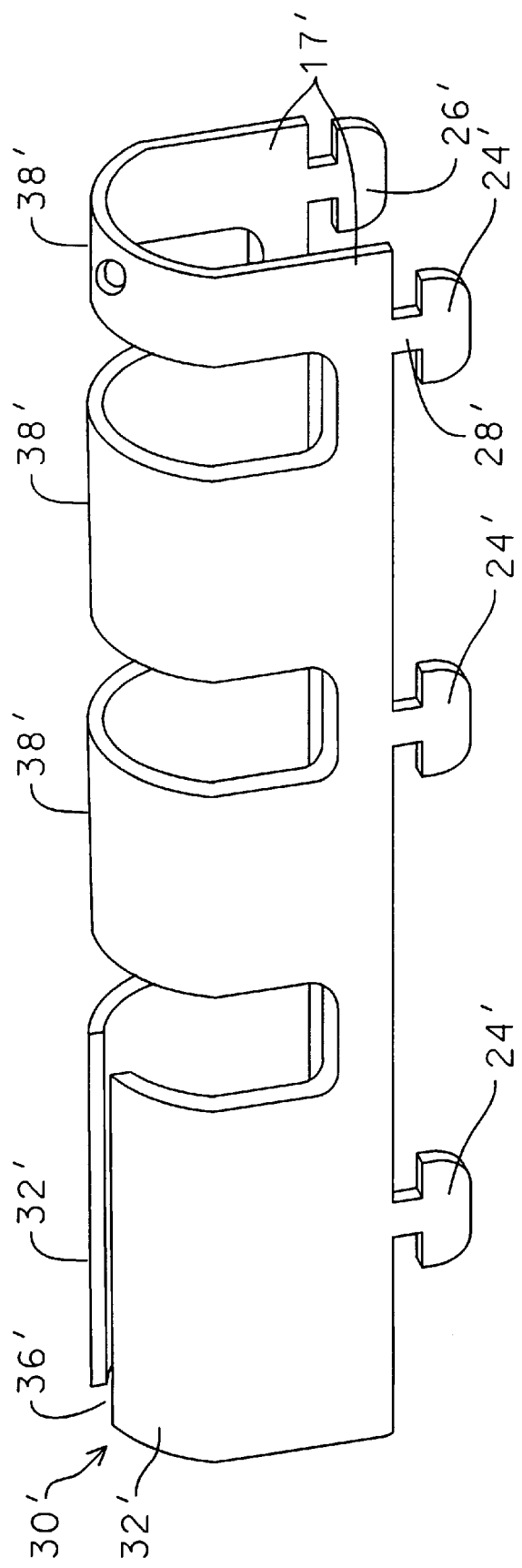
FIG. 6 is a pictorial view of the manifold of FIG. 5 according to the present invention.

The retainer 14 also includes a pair of integrally formed fastening flanges 52 which can be inserted through apertures 54 in the module housing 22 and used to mount the module 10 to the vehicle structure. The fastening flanges 52 include mounting holes 56 for accepting fasteners, such as screws or bolts, which could be used to mount the module 10 to the vehicle structure. During assembly, the fastening flanges 52 are inserted through the housing apertures 54 such that the fastening flanges 52 are exposed outside of the housing 22 when the module 10 is completely assembled as shown in FIG. 4. The manifold keys 24 are also inserted through slots 58 in the housing 22 and are exposed outside of the housing 22 when the module 10 is completely assembled.

In the preferred embodiment, the housing 22 is clam-shell shaped having a hinged end 60 which allows the housing 22 to be opened and closed. The housing apertures 54 and slots 58 are located on the hinged end 60. Also included on the housing 22 are a set of tabs 62 configured to mate with a set of grooves 64 on the opposite side of the housing 22 to hold the housing 22 in a closed position. The inside walls of the housing 22 provide reaction surfaces for the air bag 18 which are used to control and direct the air bag 18 during deployment. The soft cover 20 and tab/groove closure are configured to open, in a controlled manner, when the air bag 18 is being inflated.

The module 10 is configured to be assembled by inserting the manifold 16 into a mouth opening 66 in the air bag 18 and wrapping the air bag/manifold assembly with the soft cover 20. The soft cover 20 acts to protect the sub-module assembly and can include a tear seam (not shown) which opens during air bag 18 deployment. The manifold keys 24 are configured to extend through slots 68 in the air bag 18 and slots 69 in the soft cover 20. The air bag/soft cover/ manifold assembly is then fastened to the retainer 14 by compressing the manifold 16 and inserting the keys 24 through the retainer slots 50 locking the assembly to the retainer 14. The air bag 18 and soft cover 20 are trapped and held between the manifold 16 and retainer 14. The inflator 12 is then inserted into the retainer 14 through the holding ring 40 and into the air bag 18 through an inflator opening 70 in the air bag 18 such that the nozzle portion 34 is adjacent to the manifold gas director 30. The threaded screw end 44 extends through a screw end opening 72 in the air bag 18 and through the hole 46 in the holding flange 42 where it is secured using a threaded nut 48. The assembled sub-module is placed inside the module housing 22 with the fastening flanges 52 and the manifold keys 24 extending through the housing apertures 54 and slots 58 respectively. Finally, the housing 22 is closed with the housing tabs 62 engaging the housing grooves 64. When fastening the assembled module 10 to the vehicle structure, fasteners, such as screws or bolts, can be inserted through the mounting holes 56 and the vehicle structure securing the module 10 to the vehicle structure.

A second embodiment, shown in FIGS. 5–8, also includes an inflator 12', a retainer 14', a manifold 16', an air bag 18', a soft cover 20', and a module housing 22'. The manifold 16', shown in FIG. 6, has a substantially U-shaped cross section which is designed to encircle the inflator 12' when the module 10' is assembled. Two rows of keys 24' are integrally formed with the manifold 16' on the sidewalls 17' of the U-shaped cross section. The keys 24' can be inserted into slots in the housing 22', retainer 14', air bag 18', and soft cover 20' during assembly to hold the individual module pieces together. In the preferred embodiment, the keys 24' are T-shaped and include a pair of tabbed sections 26' connected to the manifold 16' by a stem section 28'. Other key shapes, such as L-shaped, are contemplated and could be used in place of the T-shaped keys of the preferred embodiment.

The manifold 16' is also configured as a heat shield to protect the air bag 18' from gases emitted from the inflator 12' during deployment. The manifold 16 includes a gas director 30' which comprises two flaps 32' integrally formed with the manifold 16' and located adjacent to the nozzle portion 34' of the inflator 12' when the module 10' is assembled. The flaps 32' extend around the U-shaped cross-section of the manifold 16' and form a direction opening 36' which is used to control and direct the gases emitted from the inflator 12' into the air bag 18'. The manifold 16' also includes several holding straps 38' which help hold the inflator 12' in place when the module 10' is assembled.

Figure 7:
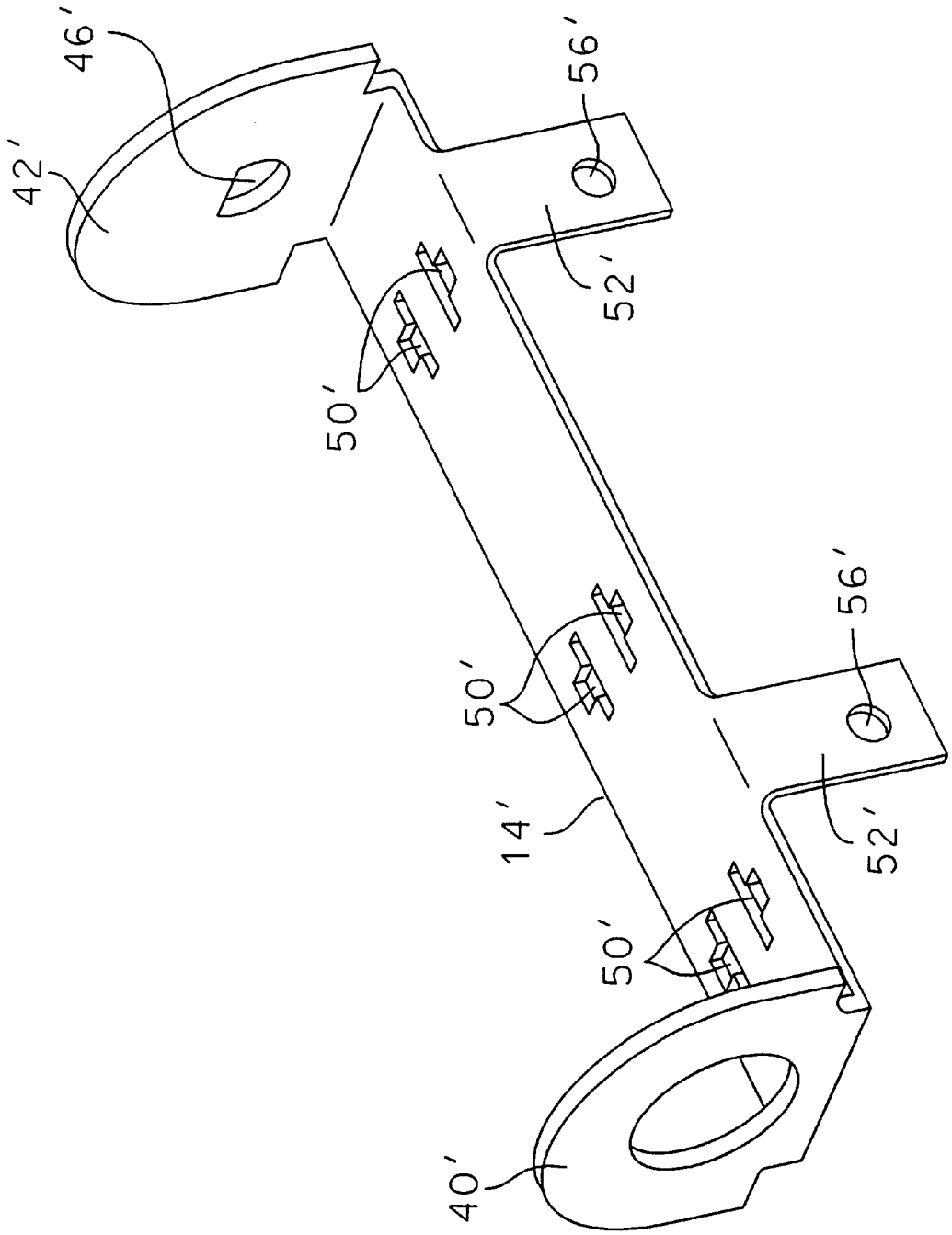
FIG. 7 is a pictorial view of the retainer of FIG. 5 according to the present invention.

The retainer 14', shown in FIG. 7, is configured for securing the inflator 12' to the module housing 22' and for providing a reaction surface during deployment. The retainer 14' comprises a holding ring 40' and a holding flange 42'. During assembly, the inflator 12' is inserted through holding ring 40' and a threaded screw end 44' of the inflator 12' is inserted through a hole 46' in the holding flange 42'. A threaded nut 48' can be screwed onto the threaded screw end 44' of the inflator 12', securing the inflator 12' to the retainer 14'. As mentioned above, the retainer 14', includes two rows of slots 50' which are T-shaped and configured for receiving the manifold keys 24'. Assembly is accomplished by elastically compressing the manifold 16' and inserting the keys 24' into the slots 50' in the retainer 14', one key per slot. The keys 24'can also be inserted through slots in the air bag 18', soft cover 20' and housing 22'. When the compression force is released from the manifold 16', the manifold 16' returns to its original uncompressed form and the stems 28' of the keys 24' are trapped in the retainer slots 50' with the tabbed sections 26' of the keys 24' abutting the side of the retainer 14' opposite the manifold 16'. The air bag 18' and soft cover 20' are trapped between the manifold 16' and retainer 14'. This configuration locks the retainer 14', manifold 16', air bag 18', and soft cover 20' together to form the sub-module. The sub-module can be disassembled by again compressing the manifold 16' and removing the keys 24' from the retainer slots 50'.

Figure 8:
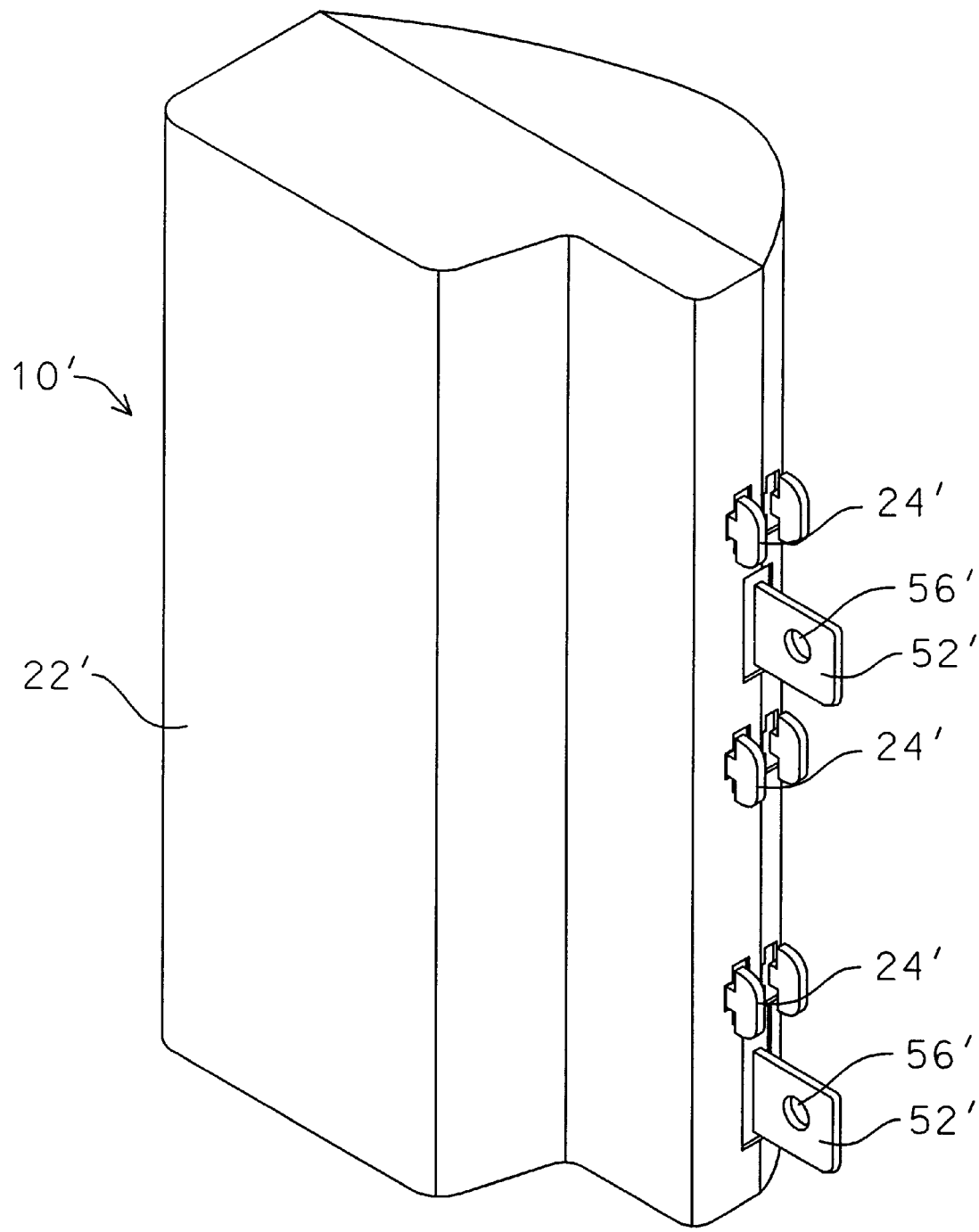
FIG. 8 is a pictorial view of the air bag module of FIG. 5 shown in an assembled form.

The retainer 14' also includes a pair of integrally formed fastening flanges 52' which can be inserted through apertures 54' in the module housing 22' and used to mount the module 10' to the vehicle structure. The fastening flanges 52' include mounting holes 56' for accepting fasteners, such as screws or bolts, which could be used to mount the module 10' to the vehicle structure. During assembly, the fastening flanges 52' are inserted through the housing apertures 54' such that the fastening flanges 52' are exposed outside of the housing 22' when the module 10' is completely assembled, as shown in FIG. 8. The manifold keys 24' are also inserted through slots 58' in the housing 22' and are exposed outside of the housing 22' when the module 10' is completely assembled.

On the preferred embodiment, the housing 22' is clamshell shaped having a hinged end 60' which allows the housing 22' to be opened and closed. The housing apertures 54' and slots 58' are located on the hinged end 60'. Also included on the housing 22' are a set of tabs 62' configured to mate with a set of grooves 64' on the opposite side of the housing 22' to hold the housing 22' in a closed position. The inside walls of the housing 22' provide reaction surfaces for the air bag 18' which are used to control and direct the air bag 18' during deployment. The soft cover 20' and tab/groove closure are configured to open, in a controlled manner, when the air bag 18' is being inflated.

The module 10' is configured to be assembled by inserting the manifold 16' into the air bag 18' and wrapping the air bag/manifold assembly with the soft cover 20'. The soft cover 20' acts to protect the sub-module assembly and can include a tear seam (not shown) which opens during air bag 18' deployment. The manifold keys 24' are configured to extend through slots 68' in the air bag 18' and slots 69' in the soft cover 20'. The air bag/soft cover/manifold assembly is then fastened to the retainer 14' by compressing the manifold 16 and inserting the keys 24' through the retainer slots 50' locking the assembly to the retainer 14'. The air bag 18' and soft cover 20' are trapped and held between the manifold 16' and retainer 14'. The inflator 12' is then inserted into the retainer 14' through the holding ring 40' and into the air bag 18' through an inflator opening 70' in the air bag 18' such that the nozzle portion 34' is adjacent to the manifold gas director 30'. The threaded screw end 44' extends through a screw end opening 72' in the air bag 18' and through the hole 46' in the holding flange 42' where it is secured using a threaded nut 48'. The assembled sub-module is placed inside the module housing 22' with the fastening flanges 52' and the manifold keys 24' extending through the housing apertures 54' and slots 58' respectively. Finally, the housing 22' is closed with the housing tabs 62' engaging the housing grooves 64'. When fastening the assembled module 10' to the vehicle structure, fasteners, such as screws or bolts, can be inserted through the mounting holes 56' and the vehicle structure securing the module 10' to the vehicle structure.

It is to be understood that the invention is not limited to the exact construction illustrated and described above, but that various changes and modifications may be made without departing from the spirit and scope of the invention as defined in the following claims.

We claim:

1. An air bag module having an inflator, an air bag, and a housing, the inflator including a nozzle portion for emitting gases into the air bag thus inflating the air bag, the module comprising:
    a retainer for holding the inflator in place in the module, said retainer having a plurality of T-shaped retainer slots; and
    a manifold for encircling the inflator, said manifold made of elastically deformable material and having keys inserted through said T-shaped retainer slots in said retainer, said T-shaped retainer slots having a first portion having a width sufficient to receive said keys therethrough and a second portion narrower than said first portion wherein said keys have a narrow stem portion which is received in said second portion of said T-shaped slots, wherein said keys are inserted into said first portion of said T-shaped slots by applying a force elastically deforming said manifold whereby upon release of said force said narrow stem portion of said keys engage said second portion of said T-shaped slots and lock said manifold to the retainer.

2. The air bag module of claim 1 wherein said manifold having a U shaped cross section, said U shaped cross section having two side walls connected by an arcuate wall.

3. The air bag module of claim 2 wherein said keys extend from each of said sidewalls.

4. The air bag module of claim 1 wherein said retainer further comprises a row of retainer slots for accepting said keys.

5. The air bag module of claim 1 wherein the housing further comprises a row of slots for accepting said keys such that said keys lock said manifold to said retainer and housing.

6. The air bag module of claim 1 wherein the inflator is located within the air bag and said manifold acts as a heat shield means for protecting the air bag from gases emitted from the inflator.

7. The air bag module of claim 1 wherein the housing further includes an aperture and said retainer further includes a fastening flange which extends through said aperture when said module is assembled, said fastening flange configured for fastening said module to a vehicle.

8. An air bag module comprising:
    a retainer having a plurality of retainer slots including a first slot portion having a first width and a second slot portion having a second width narrower than said first width and said second slot portion being disposed laterally of said first slot portion;
    an inflator held in place by said retainer, said inflator including a nozzle portion for emitting gases;
    an air bag having a plurality of slots;
    a housing having a plurality of slots; and
    a manifold for encircling the inflator, said manifold made of elastically deformable material and having keys inserted through said plurality of slots in said air bag, said retainer, and said housing, said keys having a narrow portion which engages said second slot portion of said retainer slots, wherein said keys are inserted through said first portion of said retainer slots by applying a force elastically deforming said manifold whereby upon release of said force said narrow stem portion of said keys engage said second slot portion of said retainer slots and lock said air bag and said manifold to said retainer and said housing, said housing enclosing said retainer, said inflator, said air bag and said manifold.

9. The air bag module of claim 8 wherein said manifold having a U shaped cross section having two side walls connected by an arcuate wall, said two side walls each include an extension angled toward an inside portion of said U-shaped cross section, wherein said keys extend from each said extension.

10. The air bag module of claim 8 wherein said plurality of retainer slots and said plurality of housing slots further comprise a row of slots for accepting said keys.

11. The air bag module of claim 10 wherein said plurality of retainer slots are cross shaped.

12. The air bag module of claim 10 wherein said plurality of retainer slots are T-shaped.

13. The air bag module of claim 8 wherein said retainer has a fastening flange for mounting said air bag module to a vehicle structure.

* * * * *